US012039941B2

(12) United States Patent
Liu

(10) Patent No.: US 12,039,941 B2
(45) Date of Patent: Jul. 16, 2024

(54) BACKLIGHT DRIVING CIRCUIT, DISPLAY PANEL, AND ELECTRONIC DEVICE

(71) Applicant: TCL China Star Optoelectronics Technology Co., Ltd., Guangdong (CN)

(72) Inventor: Jinfeng Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/417,804

(22) PCT Filed: Jun. 1, 2021

(86) PCT No.: PCT/CN2021/097711
§ 371 (c)(1),
(2) Date: Nov. 17, 2022

(87) PCT Pub. No.: WO2022/236889
PCT Pub. Date: Nov. 17, 2022

(65) Prior Publication Data
US 2024/0013735 A1 Jan. 11, 2024

(30) Foreign Application Priority Data
May 14, 2021 (CN) ......................... 202110529432.1

(51) Int. Cl.
*G09G 3/34* (2006.01)
*G09G 3/32* (2016.01)

(52) U.S. Cl.
CPC ............. *G09G 3/3406* (2013.01); *G09G 3/32* (2013.01); *G09G 2300/0842* (2013.01); *G09G 2310/0267* (2013.01); *G09G 2310/08* (2013.01); *G09G 2320/045* (2013.01)

(58) Field of Classification Search
CPC ................... G09G 3/3406; G09G 3/32; G09G 2300/0842; G09G 2310/0267; G09G 2310/08; G09G 2320/045; G09G 2320/0233
See application file for complete search history.

(56) References Cited

U.S. PATENT DOCUMENTS

2006/0113918 A1 6/2006 Lo et al.
2008/0030493 A1* 2/2008 Chon .................. G09G 3/3406 345/211
2015/0179101 A1* 6/2015 Ohara .................. G09G 3/3233 315/172
2020/0211477 A1* 7/2020 Lai ....................... G09G 3/3258

FOREIGN PATENT DOCUMENTS

CN 101449200 6/2009
CN 101937647 1/2011
CN 103927985 7/2014
(Continued)

*Primary Examiner* — Brent D Castiaux

(57) ABSTRACT

An embodiment of the application discloses a backlight driving circuit, a display panel, and an electronic device, including a light-emitting unit, a scan control unit, and a light-emitting control unit. The number of transistors in the scan control unit is increased to enable each transistor to alternately drive the light-emitting control unit to emit light, improving stability and extending the life of the backlight driving circuit.

20 Claims, 8 Drawing Sheets

(56) References Cited

FOREIGN PATENT DOCUMENTS

| | | |
|---|---|---|
| CN | 104299572 | 1/2015 |
| CN | 104380368 | 2/2015 |
| CN | 104541320 | 4/2015 |
| CN | 110288950 | 9/2019 |
| CN | 110520922 | 11/2019 |
| CN | 111063297 | 4/2020 |
| CN | 111477172 | 7/2020 |
| JP | 2010-091641 | 4/2010 |
| JP | 2010-145446 | 7/2010 |
| WO | WO 2015/043266 | 4/2015 |
| WO | WO 2015/188471 | 12/2015 |

* cited by examiner

BACKLIGHT DRIVING CIRCUIT, DISPLAY PANEL, AND ELECTRONIC DEVICE

RELATED APPLICATIONS

This application is a National Phase of PCT Patent Application No. PCT/CN2021/097711 having International filing date of Jun. 1, 2021, which claims the benefit of priority of Chinese Patent Application No. 202110529432.1 filed on May 14, 2021. The contents of the above applications are all incorporated by reference as if fully set forth herein in their entirety.

FIELD AND BACKGROUND OF THE INVENTION

The present invention relates to a technical field of display technology, and in particular to a backlight driving circuit, a display panel, and an electronic device.

Active miniature light-emitting diode (AM-mini LED) technology uses thin film transistors (TFTs) as backlight driving circuitry to achieve active-matrix (AM) mini LED driving and maximize the potential of mini LEDs. The AM-mini LED also has some problems in use.

For example, AM-mini LED backlight may have dark areas in some cases. The dark area phenomena are caused by 2T1C pixel backlight driving circuit used in the AM-mini LED, where one TFT is located in a control unit, the other TFT is located in a light-emitting unit. The TFT located in the control unit is connected to both a scan signal and a data signal. After working for a long time at high temperature, the TFT becomes unstable with its drifting threshold voltage, so that after the TFT is turned on in the next cycle, data voltage passing through the TFT in the control unit to the TFT in the light-emitting unit is reduced and fails to turn on the TFT in the light-emitting unit. As a consequence, the light-emitting transistor in the light-emitting unit cannot be switched on, which in turn prohibits the AM-mini LED from emitting light.

Therefore, current AM-mini LED technology has the problem of threshold voltage drifting associated with the TFT in the control unit in the backlight driving circuit, which prohibits the AM-mini LED from emitting light. Hence, it is desirable to ameliorate the problem.

Technical Problems

This application provides a backlight driving circuit and a control method thereof, a display panel, and an electronic device to address the problem of the prior art in which the TFT threshold voltage within the control unit in the backlight driving circuit drifts, causing AM-mini-LED to fail to emit light.

SUMMARY OF THE INVENTION

Technical Solutions

To address the above problems, the present application provides the following technical solutions.

In a first aspect, the present application provides a backlight driving circuit comprising: a light-emitting unit, a scan control unit, and a light-emitting control unit.

The light-emitting unit is electrically connected between a first power supply voltage line and a second power supply voltage line.

An input terminal and an output terminal of the light-emitting control unit are connected in series in a circuit composed of the light-emitting unit, the first power supply voltage line, and the second power supply voltage line.

The scan control unit comprises a first transistor and a second transistor, an input terminal and an output terminal of each of the first transistor and the second transistor is electrically connected between a data line and a control terminal of the light-emitting control unit, a control terminal of each of the first transistor and the second transistor is electrically connected to a corresponding scanning line so that the first transistor and the second transistor are alternately on.

In some embodiments, the control terminal of the first transistor is electrically connected to a scanning line corresponding to a current stage of the backlight driving circuit, and the control terminal of the second transistor is electrically connected to a scanning line of a next stage.

In some embodiments, the light-emitting control unit comprises a third transistor, the input terminal and output terminal of the third transistor comprise the input terminal and the output terminal of the light-emitting control unit, and the control terminal of the first transistor comprises the control terminal of the light-emitting control unit.

Some embodiments further comprise a capacitor. A first electrode plate of the capacitor is electrically connected to one of the input terminal and the output terminal of each of the first transistor and the second transistor, the one of the input terminal and the output terminal is electrically connected to the control terminal of the light-emitting control unit, and the second electrode plate of the capacitor is electrically connected to the second power supply voltage line.

In some embodiments, the first transistor and the second transistor are thin film transistors, and the third transistor is a field effect transistor.

In some embodiments, the first power supply voltage line is configured to load a first power supply voltage, the second power supply voltage line is configured to load a second power supply voltage, and the second power supply voltage is less than the first power supply voltage.

In some embodiments, the light-emitting unit is a mini light-emitting diode.

In a second aspect, the present application provides a display panel comprising:

- a first power supply voltage line and a second power supply voltage line;
- a plurality of data lines and a plurality of scanning lines intersecting with the plurality of data lines; and
- a backlight driving circuit, where the backlight driving circuit comprises a light-emitting unit, a scan control unit, and a light-emitting control unit.

The light-emitting unit is electrically connected between the first power supply voltage line and the second power supply voltage line.

An input terminal and an output terminal of the light-emitting control unit are connected in series in a circuit comprising the light-emitting unit, the first power supply voltage line, and the second power supply voltage line.

The scan control unit comprises a first transistor and a second transistor, an input terminal and an output terminal of each of the first transistor and the second transistor are electrically connected between a data line and a control terminal of the light-emitting control unit, a control terminal of each of the first transistor and the second transistor is electrically connected to a corresponding scanning line to cause the first transistor and the second transistor to be alternately on.

In some embodiments, the control terminal of the first transistor is electrically connected to a scanning line corresponding to a current stage of the backlight driving circuit, and the control terminal of the second transistor is electrically connected to a scanning line of a next stage of the backlight driving circuit.

In some embodiments, the light-emitting control unit comprises a third transistor, an input terminal and an output terminal of the third transistor are the input terminal and the output terminal of the light-emitting control unit, and the control terminal of the first transistor is the control terminal of the light-emitting control unit.

Some embodiments further comprise a capacitor. A first electrode plate of the capacitor is electrically connected to one of the input terminal and the output terminal of each of the first transistor and the second transistor, where the one of the input terminal and the output terminal is electrically connected to the control terminal of the light-emitting control unit. A second electrode plate of the capacitor is electrically connected to the second power supply voltage line.

In some embodiments, the first transistor and the second transistor are thin film transistors, and the third transistor is a field effect transistor.

In some embodiments, the first power supply voltage line is configured to load a first power supply voltage, and the second power supply voltage line is configured to load a second power supply voltage, where the second power supply voltage being is less than the first power supply voltage.

In some embodiments, the light-emitting unit is a mini light-emitting diode.

In a third aspect, the present application further provides an electronic device comprising a display panel comprising:

- a first power supply voltage line and a second power supply voltage line;
- a plurality of data lines and a plurality of scanning lines intersecting with the plurality of data lines; and
- a backlight driving circuit, where the backlight driving circuit comprises a light-emitting unit, a scan control unit, and a light-emitting control unit.

The light-emitting unit is electrically connected between the first power supply voltage line and the second power supply voltage line.

An input terminal and an output terminal of the light-emitting control unit are connected in series in a circuit comprising the light-emitting unit, the first power supply voltage line, and the second power supply voltage line.

The scan control unit comprises a first transistor and a second transistor. An input terminal and an output terminal of each of the first transistor and the second transistor are electrically connected between a data line and a control terminal of the light-emitting control unit. A control terminal of each of the first transistor and the second transistor is electrically connected to a corresponding scanning line so that the first transistor and the second transistor are alternately on.

In some embodiments, the control terminal of the first transistor is electrically connected to a scanning line corresponding to current stage of the backlight driving circuit, and the control terminal of the second transistor is electrically connected to a scanning line of a next stage of the backlight driving circuit.

In some embodiments, the light-emitting control unit comprises a third transistor, an input terminal and an output terminal of the third transistor are the input terminal and the output terminal of the light-emitting control unit, and the control terminal of the first transistor is the control terminal of the light-emitting control unit.

Some embodiments further comprise a capacitor. A first electrode plate of the capacitor is electrically connected to one of the input terminal and the output terminal of each of the first transistor and the second transistor, where the one of the input terminal and the output terminal is electrically connected to the control terminal of the light-emitting control unit. The second electrode plate of the capacitor is electrically connected to the second power supply voltage line.

In some embodiments, the first transistor and the second transistor are thin film transistors, and the third transistor is a field effect transistor.

In some embodiments, the first transistor is one of an N-type field effect transistor or a P-type field effect transistor, and the second transistor is the other of the N-type field effect transistor or the P-type field effect transistor.

Useful Effects:

The present application provides a backlight driving circuit comprising a light-emitting unit, a scan control unit, and a light-emitting control unit. The light-emitting unit is electrically connected between a first power supply voltage line and a second power supply voltage line. An input terminal and an output terminal of the light-emitting control unit are connected in series in a circuit formed by the light-emitting unit, the first power supply voltage line and the second power supply voltage line. The scan control unit comprises a first transistor and a second transistor. An input terminal and an output terminal of each of the first transistor and the second transistor are electrically connected between a data line and a control terminal of the light-emitting control unit, a control terminal of each of the first transistor and the second transistor is electrically connected to a corresponding scanning line so that the first transistor and the second transistor are alternately on. The number of transistors in the scan control unit is increased so that each transistor alternately drives the light-emitting control unit, improving the stability and extending the life of the backlight driving circuit.

DESCRIPTION OF SPECIFIC EMBODIMENTS OF THE INVENTION

Figure 1:
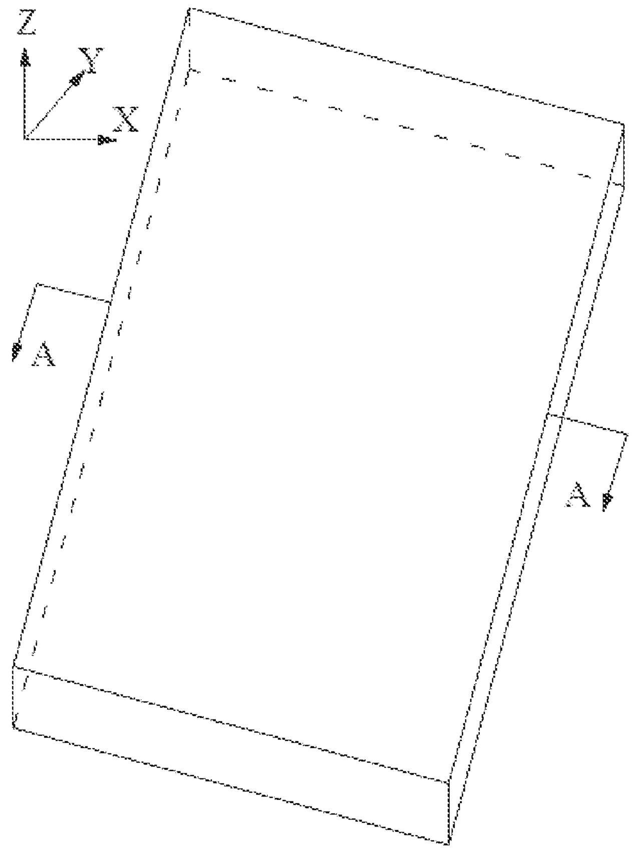
FIG. 1 is a schematic diagram showing a structure of the display panel provided in an embodiment of the application.

The following is a clear and comprehensive description of the technical solutions in the embodiments of this application with reference to the drawings in the embodiments of the application. Obviously, the embodiments described are only part of this application, not for exhaustive illustration. Based on the embodiments of the application, other embodiments which may be easily obtained by those having ordinary skills in the art without paying additional creative effort fall within the scope of the application for protection.

In the description of the application, it is to be understood that directions or position relationships indicated by terms "center", "longitudinal", "transverse", "length", "width". "thickness", "top", "bottom", "front", "back", "left", "right", "vertical", "horizontal", "top", "bottom", "inside", "outside", "clockwise", "counterclockwise", and the similar are based on orientation or positional relationship shown in the drawings, intended only to facilitate description of the application and simplify the description, and not intended to indicate or imply that the device or component referred to must have a particular orientation, or be constructed or operated in a particular orientation, and are therefore not to be construed as limitations on the application. Moreover, the terms "first" and "second" are used for descriptive purposes only and are not to be understood as indicating or implying relative importance or the number of technical features indicated. Thus, a feature that is denoted by "first" or "second" may expressly or implicitly include one or more of the same features. In the description of the application, "more than one" means two or more, unless otherwise expressly and specifically indicated.

The present application provides a backlight driving circuit, a display panel, and an electronic device, with detailed descriptions in FIGS. 1 to 10.

AM-mini LED backlight may have dark areas in some cases. The dark area phenomena are caused by 2T1C pixel backlight driving circuit used in the AM-mini LED, where one TFT is located in a control unit, the other TFT is located in a light-emitting unit. The TFT located in the control unit is connected to both a scan signal and a data signal. After working for a long time at high temperature, the TFT becomes unstable with its drifting threshold voltage, so that after the TFT is turned on in the next cycle, data voltage passing through the TFT in the control unit to the TFT in the light-emitting unit is reduced and fails to turn on the TFT in the light-emitting unit. As a consequence, the light-emitting transistor in the light-emitting unit cannot be switched on, which in turn prohibits the AM-mini LED from emitting light. Hence, embodiments of the present application provide a backlight driving circuit and a control method thereof, a display panel, and an electronic device to solve the above-mentioned problems.

With reference to FIG. 1, a schematic diagram shows a structure of the display panel provided by an embodiment of the present application. In the first aspect, an embodiment of the application provides a backlight driving circuit. First, the backlight driving circuit can be applied to a Mini-LED display panel or a Micro-LED display panel. As shown in FIG. 1, the display panel typically has a rectangular shape, but not limited to a rectangular shape, and can also have a variety of other shapes, and the display panel has eight outer corners of rounded structures to avoid inconvenience and prevent users' fingers from injury during installation, handling, or use.

In particular, a first direction Z is a direction perpendicular to a plane where a display surface of the backlight driving circuit is located, a second direction X is a direction located on the display surface of the backlight driving circuit, parallel to one edge of the display surface of the backlight driving circuit, and a third direction Y is a direction perpendicular to both the first direction Z and the second direction X.

Figure 2:
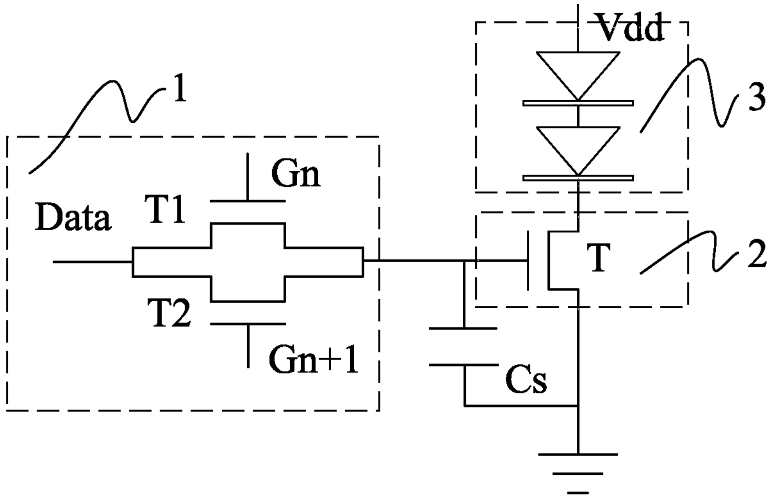
FIG. 2 is a schematic diagram showing a first structure of a backlight driving circuit provided in an embodiment of the application.

With reference to FIG. 2, a schematic diagram shows a first structure of the backlight driving circuit provided in an embodiment of the application, that is, a cross-sectional view of the display panel along A-A in FIG. 1. As shown in FIG. 2, the backlight driving circuit comprises a light-emitting unit 3, a scan control unit 1, and a light-emitting control unit 2. The light-emitting control unit 2 is electrically connected between a first power supply voltage line and a second power supply voltage line. An input terminal and an output terminal of the light-emitting control unit 2 are connected in series in a circuit comprising the light-emitting unit 3, the first power supply voltage line, and the second power supply voltage line. The scan control unit 1 comprises a first transistor and a second transistor. An input terminal and an output terminal of each of the first transistor and the second transistor are electrically connected between a data line and a control terminal of the light-emitting control unit 2. A control terminal of each of the first transistor and the second transistor is electrically connected to a corresponding scanning line so that the first transistor and the second transistor are alternately on.

In particular, the first power supply voltage line is connected to an operating voltage VDD, and the second power supply voltage line is connected to the common ground terminal voltage VSS, i.e., the second power supply voltage line is grounded. The scan control unit 1 inputs scan control signals and data control signals. The scan control unit 1 is configured to eventually input the data control signals to the light-emitting unit 3 under control of the scan control signals.

Note that the light-emitting control unit 2 includes a transistor. A control terminal of the transistor is electrically connected to an output terminal of the scan control unit 1. Switching on of the control terminal of the light-emitting control unit 2 is triggered by switching on of the scan control unit 1. An input terminal of the transistor is electrically connected to an output terminal of the light-emitting unit 3. An input terminal of the light-emitting unit 3 is electrically connected to the first power supply voltage line. The first power supply voltage line is connected to the operating voltage VDD. The output terminal of the transistor is electrically connected to the second power supply voltage line, and the second power supply voltage line is connected to ground VSS, i.e., the input terminal of the light-emitting control unit 2 is connected to the operating voltage VDD, and the output terminal of the light-emitting control unit 2 is connected to ground. In other words, the input terminal and the output terminal of the light-emitting control unit 2 are connected in series in a circuit comprising the light-emitting unit 3, the first power supply voltage line, and the second power supply voltage line. The scan control unit 1 comprises a first transistor and a second transistor, the input terminal of the scan control unit 1 is electrically connected to one of the data line and the output terminal of the scan control unit 1 is electrically connected to the light-emitting control unit 2, i.e. an input terminal and an output terminal of each of the first transistor and the second transistor is electrically connected between the data line and the control terminal of the light-emitting control unit 2. The control terminal of each of the first transistor and the second transistor is electrically connected to the corresponding scanning line. Note that, in one embodiment, the control terminal of the first transistor and the control terminal of the second transistor are respectively electrically connected to different scan control signals received by different scan stages at different time periods. The first transistor and the second transistor are transistors of the same type. Since the first transistor and the second transistor are herein switching transistors and serve only as switches, the first transistor and the second transistor may be either field effect transistors (FETs) or thin film transistors. The field effect transistor is an electronic element that controls current by means of an electric field effect. A FET uses an electric field to control a shape of a conducting channel and therefore controls the conductivity of the channel of a certain type of carrier in a semiconductor material. In another embodiment, the first transistor and the second transistor are connected to the same the scan stage, but both the first transistor and the second transistor are the field effect transistors. The first transistor and the second transistor, however, are of different types, i.e., the first transistor and the second transistor are different types of transistors selected from the N-type field effect transistor and the P-type field effect transistor. Since the N-type field effect transistor is on at a high voltage level, and the P-type field effect transistor is on at a low voltage level, when the first transistor and the second transistor are the N-type field effect transistor and the P-type field effect transistor respectively, and the first transistor and the second transistor are both connected to the same scan stage, alternating on of the first transistor and the second transistor can still be maintained to improve stability of the scan control unit 1.

Noted that the scan control unit 1 includes, but is not limited to, the two transistors, and the transistors are mutually connected in parallel, i.e., the input terminal of each of the transistors is electrically connected to the input terminal of the scan control unit 1, and the output terminal of each of the transistors is electrically connected to the output terminal of the scan control unit 1, i.e., the input terminal of the light-emitting control unit 2. The control terminals of different ones of the transistors are electrically connected to different scanning electrodes to receive different scan control signals, thus enabling alternate operation between the transistors in the scan control unit 1 to drive the light-emitting control unit 2, and avoiding continuous working of single one of the transistors in the scan control unit 1 for a long time as well as the threshold voltage drifting under high temperature, that affect the stability of the backlight driving circuit. Therefore, the scan control unit 1 is connected to both the scan control signals and the data control signals. Since the scan control signals are input into the scan control unit 1 stage by stage, and the scan control signals of different scan stages are connected to different ones of the transistors. Therefore, when the scan control signals of different scan stages are input into the scan control unit 1, the scan control signals connecting the scan stages are input to respective transistors corresponding to the scan stages, and cause the transistors to switch on the scan control unit 1, which in turn drives the light-emitting control unit 2. That is, the scan control unit 1 is configured to input the data control signals to the light-emitting control unit 2 under control of the scan control signals.

Similarly, the light-emitting control unit 2 includes, but is not limited to, one light-emitting device. A user may set the number of the light-emitting devices according to actual needs. Unlike the connection of the transistors within the scan control unit 1, the light-emitting devices are mutually connected in series.

Note that the light-emitting unit 3 is connected in series with the light-emitting control unit 2, that the output terminal of the light-emitting unit 3 is electrically connected to the input terminal of the light-emitting control unit 2. A voltage level at the output terminal of the light-emitting unit 3 is equal to a voltage level at the input terminal of the light-emitting control unit 2. The input terminal of the light-emitting unit 3 is electrically connected to the first power supply voltage line to connect the operating voltage VDD. The output terminal of the light-emitting control unit 2 is electrically connected to the second power supply voltage line to connect to the ground terminal VSS.

Further, the control terminal of the first transistor is electrically connected to a scanning line corresponding to a current stage of the backlight driving circuit, and the control terminal of the second transistor is electrically connected to a scanning line of a next stage.

Note that in one embodiment of the present application, the first transistor and the second transistor are transistors of the same type. The control terminal of the first transistor is electrically connected to a scanning line corresponding to the current stage of the backlight driving circuit to receive a current stage scan signal sent by the scanning line of the current stage. The control terminal of the second transistor is electrically connected to the scanning line of the next stage of the backlight driving circuit to receive a next stage scan signal sent by the scanning line of the next stage. Since the current stage scan signal and the next stage scan signal are always alternately on, the first transistor and the second transistor always operate alternately, thus, to improve the stability of the scan control unit 1 and even the backlight driving circuit.

Further, the light-emitting control unit 2 comprises a third transistor. An input terminal and an output terminal of the third transistor comprise an input terminal and an output terminal of the light-emitting control unit 2, and the control terminal of the first transistor comprises the control terminal of the light-emitting control unit 2.

Note that the light-emitting control unit 2 includes, but is not limited to, the third transistor. In one embodiment of the present application, the light-emitting control unit 2 includes only the third transistor. The third transistor is the driver transistor. In the example, the input terminal and output terminal of the third transistor comprise the input terminal and output terminal of the light-emitting control unit 2, the control terminal of the first transistor comprises the control terminal of the light-emitting control unit 2. Further, since the third transistor is a drive transistor, the third transistor may need to withstand a larger current within the backlight driving circuit and work for a long time. Since a thin film transistor is generally applied in a small current scenario of microampere level uA, while the backlight driving circuit in the embodiment of the present application generally is applied to a milliampere level mA current scenario, if the third transistor is made up of a thin film transistor, a lifetime of the third transistor may be shorten under long time operation, which in turn affects the lifetime of the backlight driving circuit. Therefore, the third transistor preferably comprises a field effect transistor to fully ensure the stability of the backlight driving circuit.

Further, the backlight driving circuit further comprises a capacitor. The first electrode plate of the capacitor is electrically connected to one of the input terminal and the output terminal of each of the first transistor and the second transistor, where the one of the input terminal and the output terminal is electrically connected to the control terminal of the light-emitting control unit 2. The second electrode plate of the capacitor is electrically connected to the second power supply voltage line.

Note that the backlight driving circuit further comprises a capacitor. The first electrode plate of the capacitor is electrically connected to one of the input terminal and the output terminal of each of the first transistor and the second transistor, where the one of the input terminal and the output terminal is electrically connected to the control terminal of the light-emitting control unit 2. The second electrode plate of the capacitor is electrically connected to the second power supply voltage line. The capacitor is charged when the light-emitting control unit 2 is on, and discharged when the scan control unit 1 is turned off. The capacitor can discharge to keep on providing a voltage to the control terminal of the light-emitting control unit 2, so that the light-emitting control unit 2 can still function properly.

Further, the first transistor and the second transistor are thin film transistors, and the third transistor is a field effect transistor.

Note that in the example, since the first transistor and the second transistor are only used as switching transistors configured to switch on the scan control unit 1 and connect the scan control signal to the backlight driving circuit. Therefore, the first transistor and the second transistor may comprise thin film transistors. The third transistor serving as a driving transistor has higher stability requirements. Therefore, the third transistor preferably comprises a field effect transistor.

Further, the first power supply voltage line is configured to load a first power supply voltage. The second power supply voltage line is configured to load a second power supply voltage. The second power supply voltage is less than the first power supply voltage.

Note that the first power supply voltage line is connected to the working voltage VDD, and the second power supply voltage line is connected to the ground terminal VSS. The ground terminal VSS has a voltage of 0. The light-emitting unit 3 and the light-emitting control unit 2 are located between the first power supply voltage line and the second power supply voltage line. Generally, since the light-emitting unit 3 may comprise various light-emitting devices, and the light-emitting control unit 2 itself has a voltage level, the light-emitting unit 3 may have a certain resistance. The first power supply voltage, after passing through the light-emitting unit 3 and the light-emitting control unit 2, may be reduced into a second power supply voltage. Therefore, the second power supply voltage is less than the first power supply voltage. In particular, when the light-emitting unit 3 has no light-emitting device, and the light-emitting control unit 2 has no resistance, that is, when the light-emitting unit 3 and the light-emitting control unit 2 can be treated as a wire, the light-emitting unit 3 can be regarded as having no resistance, that is, the second power supply voltage is equal to the first power supply voltage. Because any wire also has a certain resistance, that is, line resistance, the light-emitting unit 3 and the light-emitting control unit 2 must have resistance, and the second power supply voltage is always less than the first power supply voltage. Further, the first power supply voltage is equal to a current within the light-emitting unit 3 multiplied by the resistance within the light-emitting unit 3 plus a current within the light-emitting control unit 2 multiplied by the resistance within the light-emitting control unit 2 plus the second power supply voltage.

The light-emitting unit 3 and the light-emitting control unit 2 have a resistance greater than 0. As the light-emitting unit 3 and the light-emitting control unit 2 is located on the same wire, the current flowing into the light-emitting unit 3 is equal to the current flowing into the light-emitting control unit 2. As a consequence, the first power supply voltage is greater than the second power supply voltage. In other words, the second power supply voltage is less than the first power supply voltage. Further, the light-emitting unit 3 is a mini light-emitting diode.

Note that the light-emitting unit 3 contains at least one the light-emitting device. In an embodiment of the application, the light-emitting unit 3 is a mini light-emitting diode.

Figure 3:
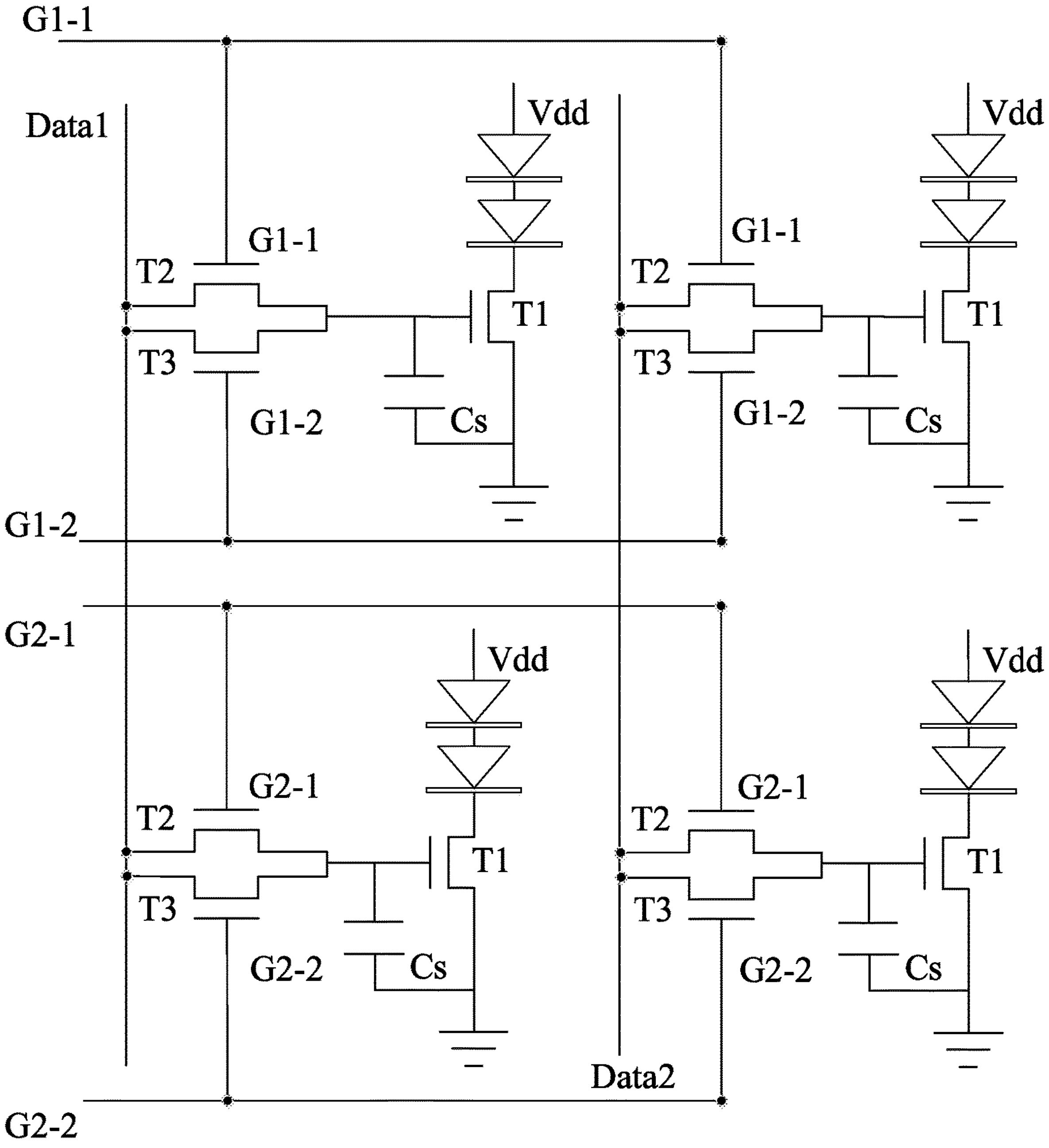
FIG. 3 is a schematic diagram showing a first scenario of the backlight driving circuit provided in an embodiment of the application.
Figure 4:
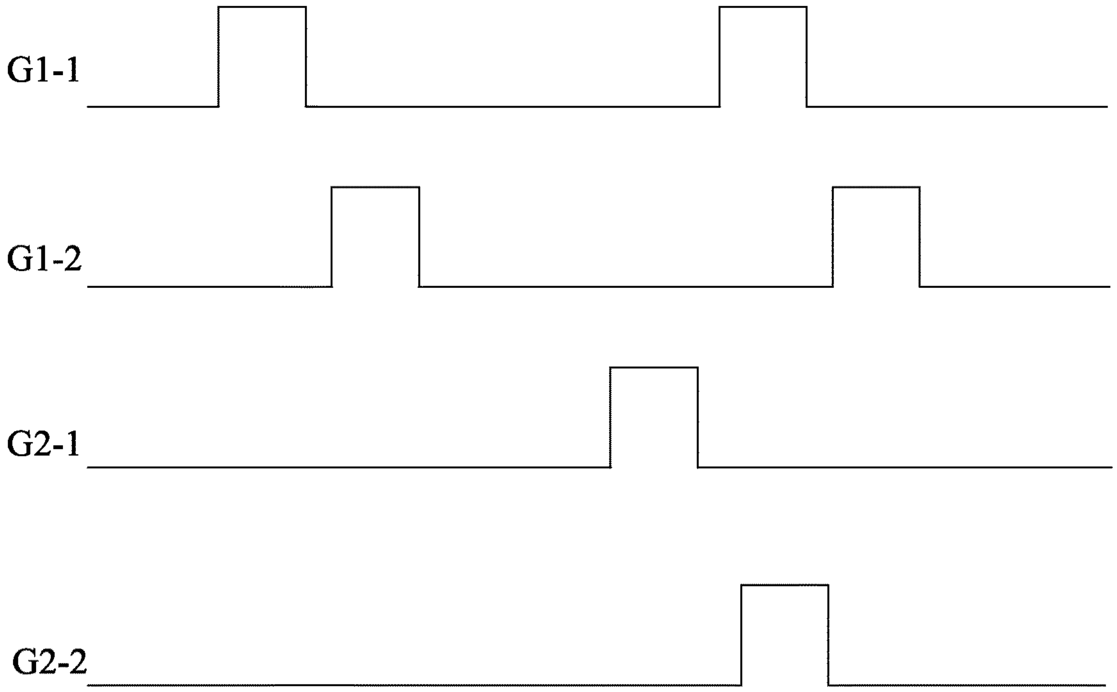
FIG. 4 is a first timing sequence diagram of the backlight driving circuit provided in an embodiment of the application.

In one embodiment, the scan control unit 1 comprises two the transistors, a first transistor T1 and a second transistor T2. The input terminal of the first transistor T1 and the input terminal of the second transistor T2 are electrically connected to the data control signals, the control terminal of the first transistor T1 is electrically connected to a current stage scan control signals GN, the control terminal of the second transistor T2 is electrically connected to a next stage scan control signal G (N+1). That is, during a first time period, the first transistor T1 is on, the second transistor T2 is off, and the control terminal of the first transistor T1 is electrically connected to the scan control unit 1 via the current stage scan control signal GN, causing the scan control unit 1 to transmit the signals to the light-emitting control unit 2. During a second time period, the second transistor T2 is on, the first transistor T1 is off, the control terminal of the second transistor T2 is connected to the scan control unit 1 via the next stage scan control signal G (N+1), causing the scan control unit 1 to pass the signals to the light-emitting control unit 2. That is, in the example, the two the transistors in the scan control unit 1 are connected to different scan control signals in different time periods under control of different scan stages, thus making the two transistors in the scan control unit 1 work alternately. Specifically, FIG. 3 is a schematic diagram showing a first scene in the embodiment of the present application. FIG. 4 is a first timing sequence diagram of the backlight driving circuit provided by the embodiment of the present application, corresponding to FIG. 3.

Figure 5:
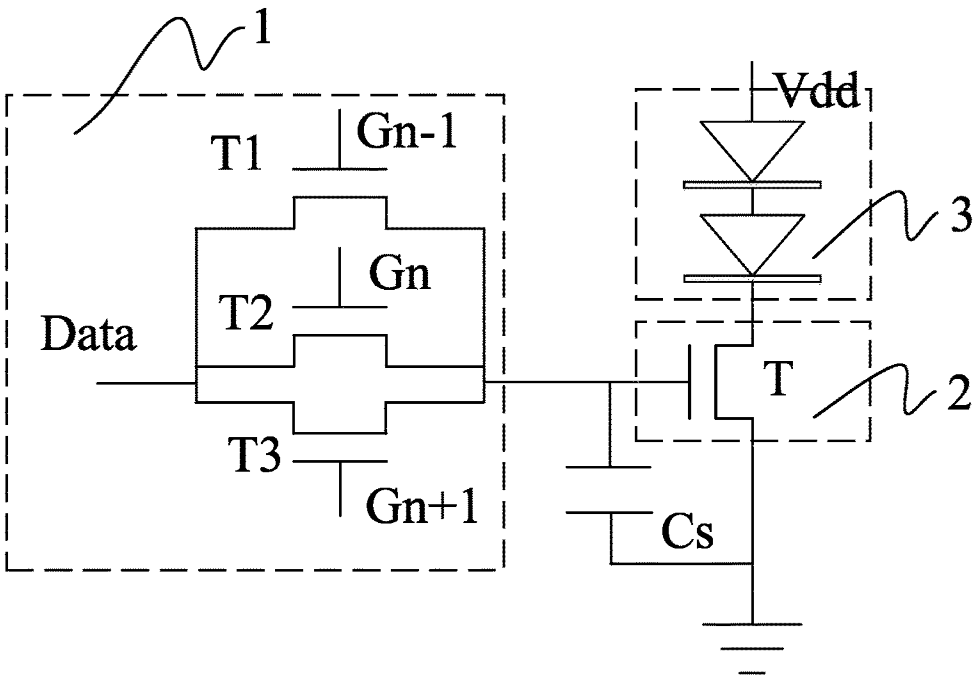
FIG. 5 is a schematic diagram showing a fourth structure of the backlight driving circuit provided by the present application embodiment.
Figure 6:
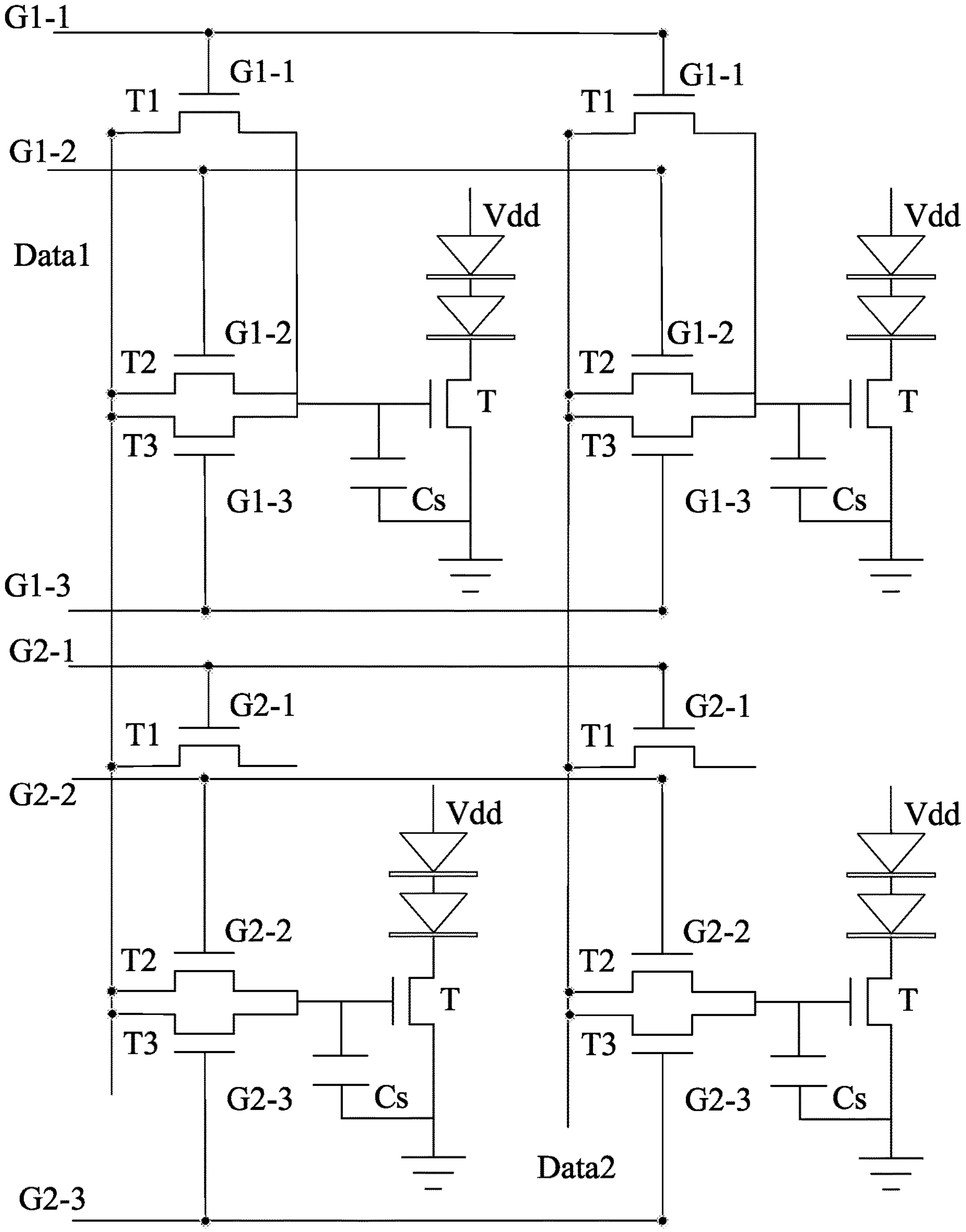
FIG. 6 is a schematic diagram showing a second scenario of the backlight driving circuit provided by the present application embodiment.
Figure 7:
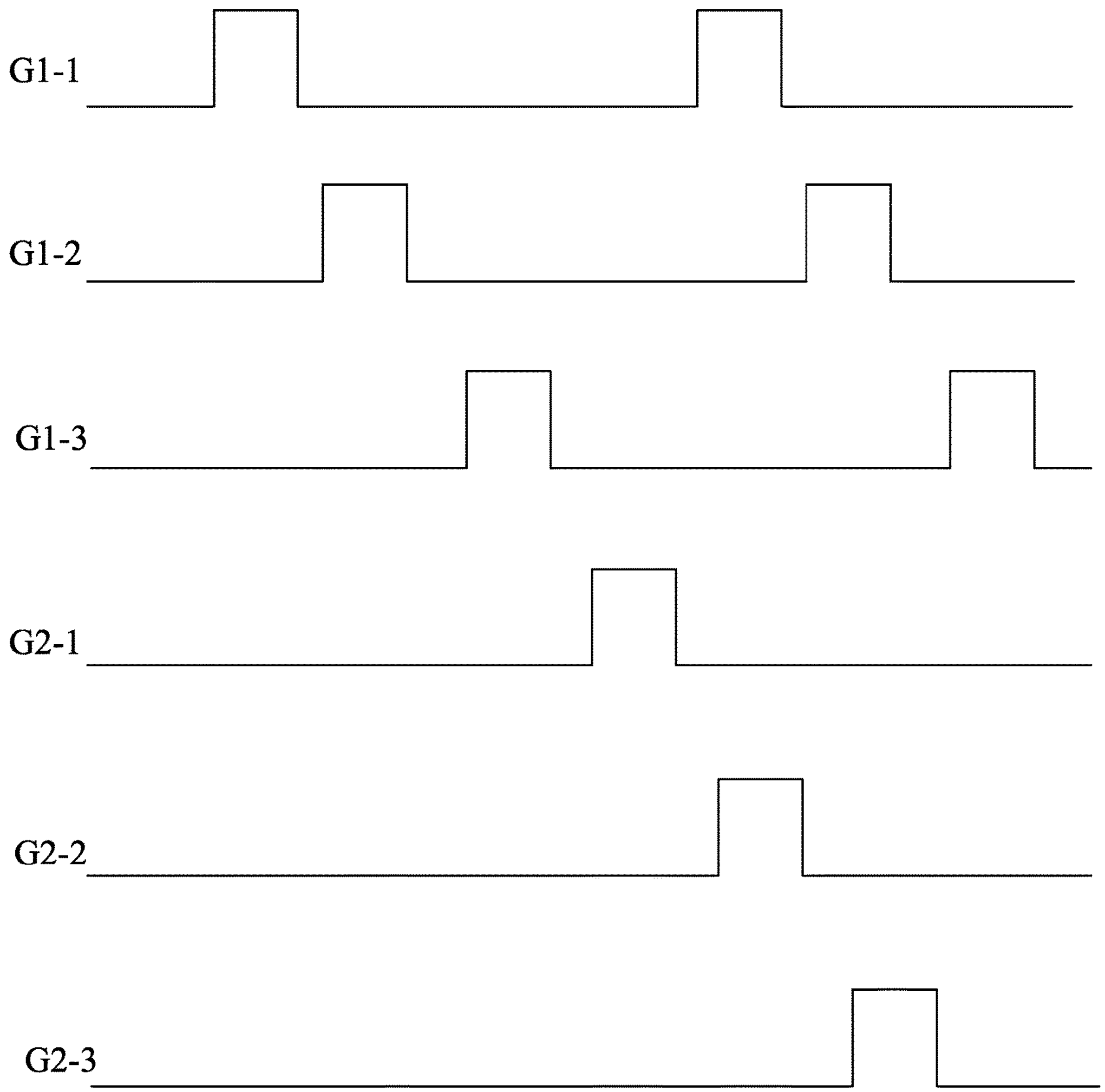
FIG. 7 is a second timing sequence diagram of the backlight driving circuit provided by the present application embodiment.

In one embodiment, the scan control unit 1 comprises three transistors: the first transistor T1, the second transistor T2, and the third transistor T3. With reference to FIG. 5, the input terminal of the first transistor T1, the input terminal of the second transistor T2, and the input terminal of the third transistor T3 are electrically connected to the data control signals. The control terminal of the first transistor T1 is electrically connected to a previous stage scan control signal G (N−1). The control terminal of the second transistor T2 is electrically connected to the current stage scan control signal GN. The control terminal of the third transistor T3 is electrically connected to the next stage scan control signal G (N+1). In other words, during the first time period, the first transistor T1 is on, the second transistor T2 and the third transistor T3 are off, the control terminal of the first transistor T1 is connected to the scan control unit 1 via the previous stage scan control signal G (N−1) to cause the light-emitting control unit 2 to emit light. In a second time period, the second transistor T2 is on, the first transistor T1 and the third transistor T3 are off, and the control terminal of the second transistor T2 is connected to the scan control signal via the current stage scan control signal GN to cause the light-emitting control unit 2 to emit light. In a third time period, the third transistor T3 is on, the second transistor T2 and the first transistor T1 are off, and the control terminal of the third transistor T3 is connected to the scan control signal via the next stage scan control signal G (N+1) to cause the light-emitting control unit 2 to emit light. Specifically, FIG. 6 is a schematic diagram showing a second scenario of an embodiment of the present application. FIG. 7 is a second timing sequence diagram of the backlight driving circuit provided by an embodiment of the present application, corresponding to FIG. 6.

Figure 8:
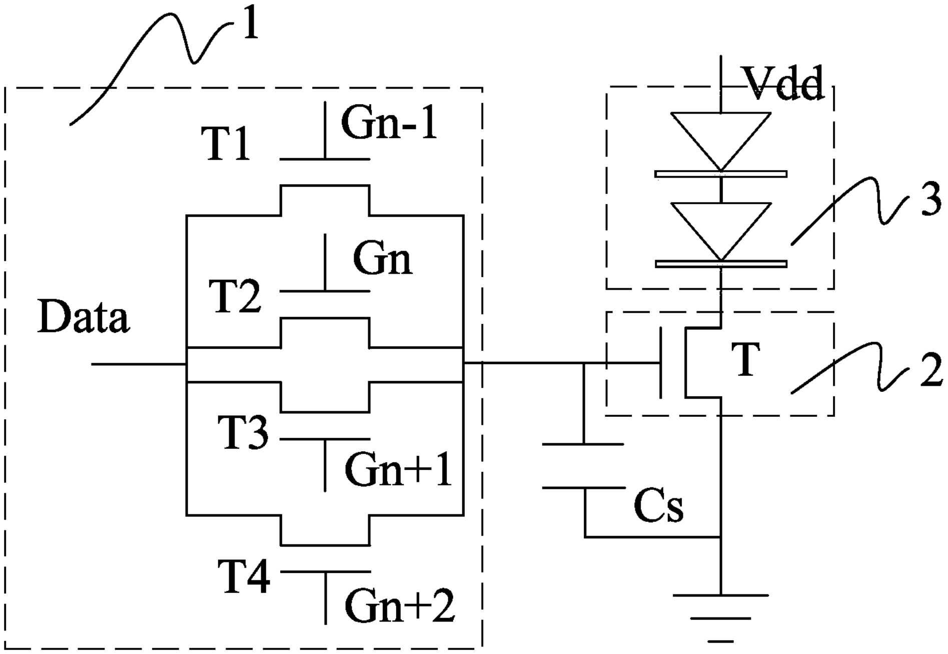
FIG. 8 is a schematic diagram showing an eighth structure of the backlight driving circuit provided by the present application embodiment.
Figure 9:
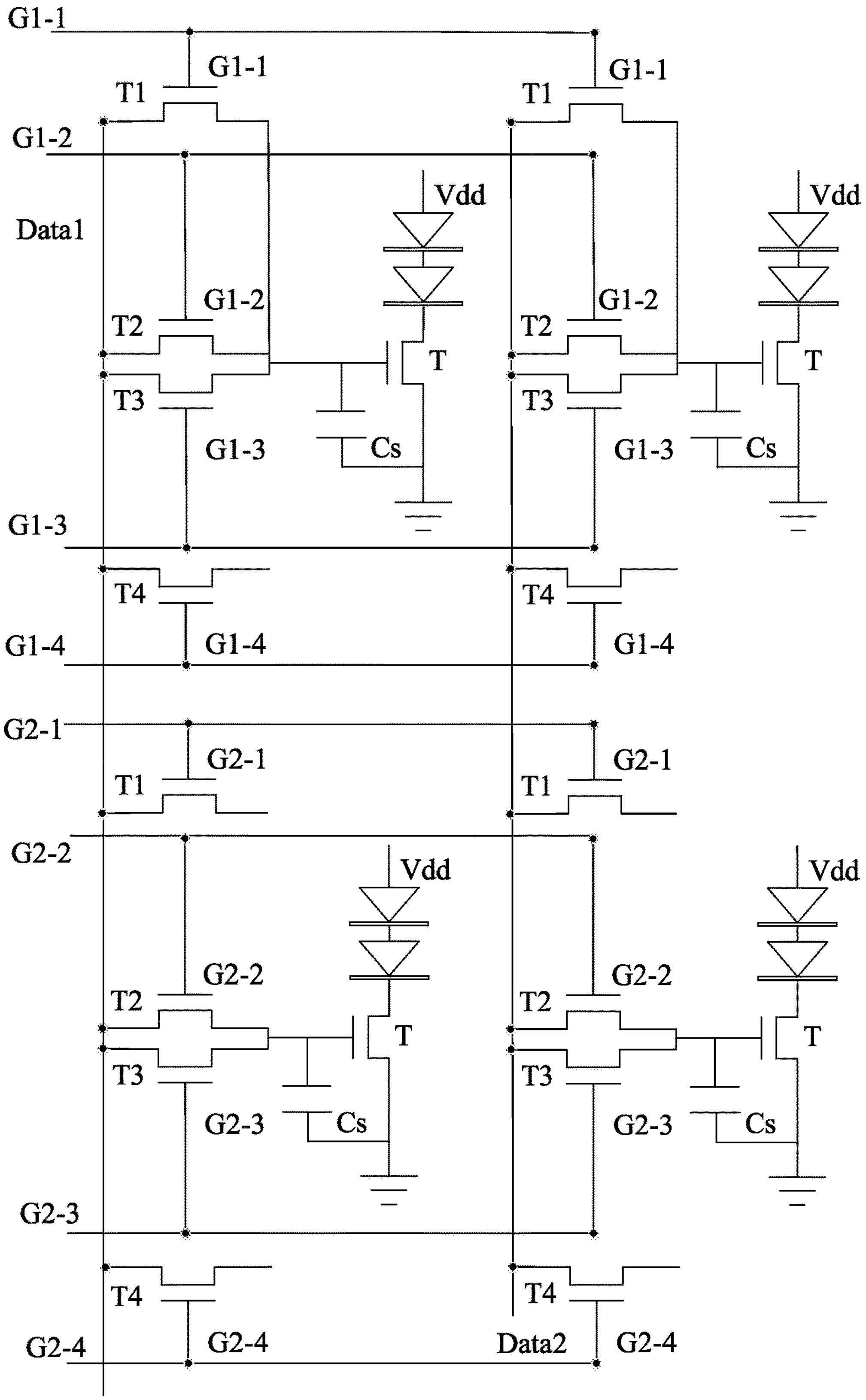
FIG. 9 is a schematic diagram showing a third scenario of the backlight driving circuit provided by the present application embodiment.
Figure 10:
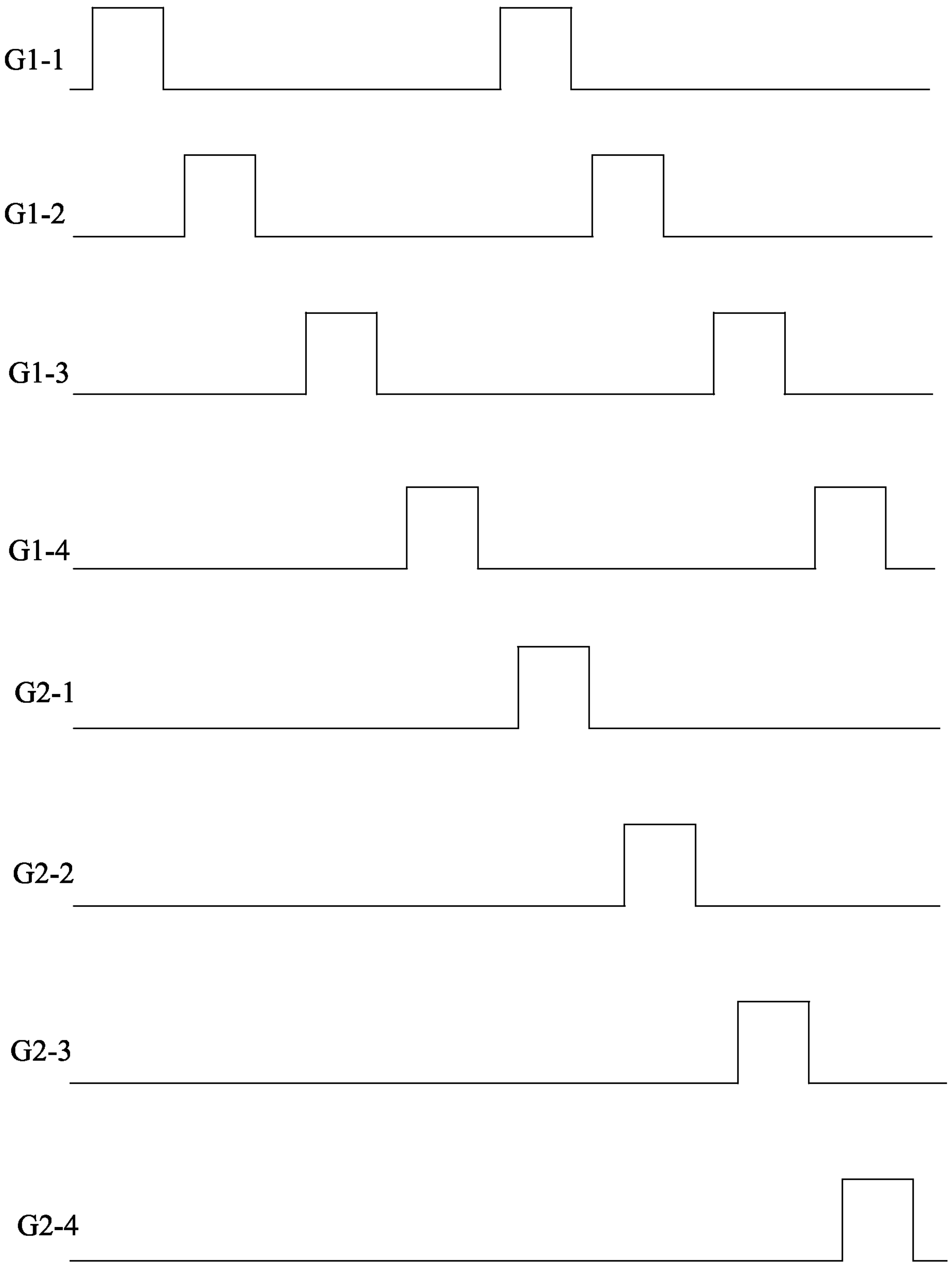
FIG. 10 is a third timing sequence diagram of the backlight driving circuit provided by the present application embodiment.

In one embodiment, the scan control unit 1 comprises four the transistors: the first transistor T1, the second transistor T2, the third transistor T3, and the fourth transistor T4. With reference to FIG. 8, the input terminal of the first transistor T1, the input terminal of the second transistor T2, the input terminal of the third transistor T3, and the input terminal of the fourth transistor T4 are electrically connected to the data control signals. The control terminal of the first transistor T1 is electrically connected to the previous stage scan control signal G (N−1). The control terminal of the second transistor T2 is electrically connected to the current stage scan control signal GN. The control terminal of the third transistor T3 is electrically connected to the next stage scan control signal G (N+1). The control terminal of the fourth transistor T4 is electrically connected to a further next stage scan control signal G (N+2). That is, during a first time period, the control terminal of the first transistor T1 is connected to the scan control unit 1 via the previous stage scan control signal G (N−1) to cause the light-emitting control unit 2 to emit light. During a second time period, the control terminal of the second transistor T2 is connected to the scan control unit 1 via the current stage scan control signal GN to cause the light-emitting control unit 2 to emit light. During a third time period, the control terminal of the third transistor T3 is connected to the scan control signal via the next stage scan control signal G (N+1) to cause the light-emitting control unit 2 to emit light. During a fourth time period, the control terminal of the fourth transistor T4 is connected to the scan control signal via the further next stage scan control signal G (N+2) to cause the light-emitting control unit 2 to emit light. Specifically, FIG. 9 is a schematic diagram showing a third scene schematic of an embodiment of the present application. FIG. 10 is a third timing sequence diagram of the backlight driving circuit provided in an embodiment of the present application, corresponding to FIG. 9.

In a second aspect, embodiments of the present application provide a display panel comprising a first power supply voltage line and a second power supply voltage line; a plurality of data lines and a plurality of scanning lines intersecting with the plurality of data lines; and a plurality of backlight driving circuits as described in any one of the above.

Further, the display panel includes a first carrier and a second carrier. The first carrier includes a memory. The second carrier includes a processor. The first carrier may be configured to store one or more control methods including, but not limited to, the control methods of the backlight driving circuit described above. The second carrier is configured to execute each of the control methods stored with the first carrier. For example, the second carrier is configured to perform the control method of the backlight driving circuit in the first carrier, comprising:

providing different scanning signals to the two scanning lines electrically connected to the two control terminals of the first transistor and the second transistor, causing the first transistor and the second transistor to be alternately on.

In a third aspect, embodiments of the present application further provide an electronic device comprising a display panel as described above.

Note that the display panel comprises a backlight driving circuit as described above, the first carrier, and the second carrier. A control method stored in the first carrier can be executed by the second carrier to control the backlight driving circuit.

In a fourth aspect, an embodiment of the present application provides a control method of a backlight driving circuit for controlling a backlight driving circuit as described in any of the foregoing descriptions, comprising: providing different scanning signals to the two scanning lines electrically connected to the two control terminals of the first transistor and the second transistor, causing the first transistor and the second transistor to be alternately on.

Specifically, the backlight driving circuit receives the data control signals and the scan control signals, controls corresponding field effect transistors in the scan control unit 1 to be alternately on according to the scan control signals from the different scan stages or in different time periods, so that the data control signal is input to the scan control unit 1 and the light-emitting control unit 2, thereby to drive the light-emitting control unit 2 to work.

Further, since respective ones of the control terminals of the transistors in the scan control unit 1 is electrically connected to one of the scanning lines, and the input terminals of the transistors are electrically connected to one of the data lines, when the scanning lines connected to the transistors is input high/low voltage levels, the transistors are on, and the data control signals are transmitted from the input terminals of the transistors to the light-emitting control unit 2 and then to the light-emitting unit 3 to make the light-emitting unit 3 emit light.

The backlight driving circuit, display panel, electronic device according to embodiments of the application have been detailed in foregoing description. The application provides specific examples to describe principles and embodiments of the application, while the description of the embodiments is only provided to facilitate understanding of technical solutions and principles of the application. Note that a person with ordinary skills in the art can modify the aforementioned technical solutions of the embodiments or provide equivalent substitutions to some of the technical features in the embodiments. These modifications or substitutions do not substantially make themselves and the modified technical solutions depart from the scope of the technical solutions of the embodiments of the present application.

What is claimed is:

1. A backlight driving circuit comprising:

a light-emitting unit;

a scan control unit; and a light-emitting control unit;

wherein the light-emitting unit is electrically connected between a first power supply voltage line and a second power supply voltage line;

an input terminal and an output terminal of the light-emitting control unit are connected in series in a circuit comprising the light-emitting unit, the first power supply voltage line, and the second power supply voltage line;

the scan control unit comprises a first transistor and a second transistor, an input terminal and an output terminal of each of the first transistor and the second transistor are electrically connected between a data line and a control terminal of the light-emitting control unit, a control terminal of each of the first transistor and the second transistor is electrically connected to a same scanning line so that the first transistor and the second transistor are alternately on.

2. The backlight driving circuit according to claim 1, wherein the control terminal of the first transistor is electrically connected to a scanning line corresponding to a current stage of the backlight driving circuit, and the control terminal of the second transistor is electrically connected to a scanning line of a next stage of the backlight driving circuit.

3. The backlight driving circuit according to claim 2, wherein the light-emitting control unit comprises a third transistor, an input terminal and an output terminal of the third transistor comprise the input terminal and the output terminal of the light-emitting control unit, and the control terminal of the first transistor comprises the control terminal of the light-emitting control unit.

4. The backlight driving circuit according to claim 3, further comprising:

a capacitor, wherein a first electrode plate of the capacitor is electrically connected to one of the input terminal and the output terminal of each of the first transistor and the second transistor, the one of the input terminal and the output terminal is electrically connected to the control terminal of the light-emitting control unit, and a second electrode plate of the capacitor is electrically connected to the second power supply voltage line.

5. The backlight driving circuit according to claim 3, wherein the first transistor and the second transistor are thin film transistors, and the third transistor is a field effect transistor.

6. The backlight driving circuit according to claim 1, wherein the first power supply voltage line is configured to load a first power supply voltage, the second power supply voltage line is configured to load a second power supply voltage, and the second power supply voltage is less than the first power supply voltage.

7. The backlight driving circuit according to claim 1, wherein the light-emitting unit is a mini light-emitting diode.

8. A display panel comprising:

a first power supply voltage line and a second power supply voltage line;

a plurality of data lines and a plurality of scanning lines intersecting with the plurality of data lines; and a backlight driving circuit, wherein the backlight driving circuit comprises a light-emitting unit, a scan control unit, and a light-emitting control unit;

the light-emitting unit is electrically connected between the first power supply voltage line and the second power supply voltage line;

an input terminal and an output terminal of the light-emitting control unit are connected in series in a circuit comprising the light-emitting unit, the first power supply voltage line, and the second power supply voltage line;

the scan control unit comprises a first transistor and a second transistor, an input terminal and an output terminal of each of the first transistor and the second transistor are electrically connected between a data line and a control terminal of the light-emitting control unit, a control terminal of each of the first transistor and the second transistor is electrically connected to a same scanning line to cause the first transistor and the second transistor to be alternately on.

9. The display panel according to claim 8, wherein the control terminal of the first transistor is electrically connected to a scanning line corresponding to a current stage of the backlight driving circuit, and the control terminal of the second transistor is electrically connected to a scanning line of a next stage of the backlight driving circuit.

10. The display panel according to claim 9, wherein the light-emitting control unit comprises a third transistor, an input terminal and an output terminal of the third transistor comprise the input terminal and the output terminal of the light-emitting control unit, and the control terminal of the first transistor comprises the control terminal of the light-emitting control unit.

11. The display panel according to claim 10, further comprising:

a capacitor, wherein a first electrode plate of the capacitor is electrically connected to one of the input terminal and the output terminal of each of the first transistor and the second transistor, the one of the input terminal and the output terminal is electrically connected to the control terminal of the light-emitting control unit, and a second electrode plate of the capacitor is electrically connected to the second power supply voltage line.

12. The display panel according to claim 11, wherein the first transistor and the second transistor comprise thin film transistors, and the third transistor comprises a field effect transistor.

13. The display panel according to claim 8, wherein the first power supply voltage line is configured to load a first power supply voltage, the second power supply voltage line is configured to load a second power supply voltage, and the second power supply voltage is less than the first power supply voltage.

14. The display panel according to claim 8, wherein the light-emitting unit is a mini light-emitting diode.

15. An electronic device comprising a display panel, wherein the display panel comprises:

a first power supply voltage line and a second power supply voltage line;

a plurality of data lines and a plurality of scanning lines intersecting with the plurality of data lines; and a backlight driving circuit, wherein the backlight driving circuit comprises a light-emitting unit, a scan control unit, and a light-emitting control unit;

the light-emitting unit is electrically connected between the first power supply voltage line and the second power supply voltage line;

an input terminal and an output terminal of the light-emitting control unit are connected in series in a circuit comprising the light-emitting unit, the first power supply voltage line, and the second power supply voltage line;

the scan control unit comprises a first transistor and a second transistor, an input terminal and an output terminal of each of the first transistor and the second transistor are electrically connected between a data line and a control terminal of the light-emitting control unit, a control terminal of each of the first transistor and the second transistor is electrically connected to a same scanning line to cause the first transistor and the second transistor to be alternately on.

16. The electronic device according to claim 15, wherein the control terminal of the first transistor is electrically connected to a scanning line corresponding to a current stage of the backlight driving circuit, and the control terminal of the second transistor is electrically connected to the scanning line of the next stage of the backlight driving circuit.

17. The electronic device according to claim 16, wherein the light-emitting control unit comprises a third transistor, an input terminal and an output terminal of the third transistor comprise the input terminal and the output terminal of the light-emitting control unit, and the control terminal of the first transistor comprises the control terminal of the light-emitting control unit.

18. The electronic device according to claim 17, further comprising:

a capacitor, wherein a first electrode plate of the capacitor is electrically connected to one of the input terminal and the output terminal of each of the first transistor and the second transistor, the one of the input terminal and the output terminal is electrically connected to the control terminal of the light-emitting control unit, and a second electrode plate of the capacitor is electrically connected to the second power supply voltage line.

19. The electronic device according to claim 17, wherein the first transistor and the second transistor comprise thin film transistors and the third transistor comprises a field effect transistor.

20. The electronic device according to claim 17, wherein the first transistor is one of an N-type field effect transistor or a P-type field effect transistor, and the second transistor is the other of the N-type field effect transistor or the P-type field effect transistor.

* * * * *